United States Patent

Rust

(10) Patent No.: US 10,401,866 B2
(45) Date of Patent: Sep. 3, 2019

(54) METHODS AND SYSTEMS FOR LIDAR POINT CLOUD ANOMALIES

(71) Applicant: GM GLOBAL TECHNOLOGY OPERATIONS LLC, Detroit, MI (US)

(72) Inventor: Ian Rust, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 125 days.

(21) Appl. No.: 15/585,891

(22) Filed: May 3, 2017

(65) Prior Publication Data

US 2017/0300059 A1 Oct. 19, 2017

(51) Int. Cl.
G05D 1/02 (2006.01)
G01S 17/89 (2006.01)
G01S 17/93 (2006.01)
G01S 7/00 (2006.01)

(52) U.S. Cl.
CPC ............ *G05D 1/0238* (2013.01); *G01S 7/003* (2013.01); *G01S 17/89* (2013.01); *G01S 17/936* (2013.01); *G05D 1/024* (2013.01); *G05D 1/0212* (2013.01); *G05D 1/0231* (2013.01); *G05D 1/0242* (2013.01); *G05D 1/0268* (2013.01); *G05D 1/0276* (2013.01); *G05D 2201/0213* (2013.01)

(58) Field of Classification Search
CPC .. G05D 1/0238; G05D 1/0212; G05D 1/0231; G05D 1/0242; G05D 1/0268; G01S 7/003; G01S 17/89; G01S 17/936
USPC .......................................................... 701/25
See application file for complete search history.

(56) References Cited

U.S. PATENT DOCUMENTS

| 9,014,415 B2* | 4/2015 | Chen ..................... G06T 7/0002 382/100 |
| 2010/0250482 A1* | 9/2010 | Ma .......................... A01G 23/00 706/54 |
| 2013/0216089 A1* | 8/2013 | Chen ..................... G06T 7/0002 382/100 |
| 2014/0368807 A1* | 12/2014 | Rogan ..................... G01S 17/50 356/28 |
| 2015/0206343 A1* | 7/2015 | Mattila ................... G06T 17/05 345/420 |
| 2015/0243004 A1* | 8/2015 | Lau ........................ G01S 7/4808 382/255 |
| 2016/0335796 A1* | 11/2016 | Roimela ................ G06T 17/05 |
| 2017/0075355 A1* | 3/2017 | Micks .................. G05D 1/0257 |
| 2017/0300059 A1* | 10/2017 | Rust ....................... G01S 17/89 |
| 2018/0136332 A1* | 5/2018 | Barfield, Jr. ............ G01S 17/42 |

* cited by examiner

*Primary Examiner* — Thomas G Black
*Assistant Examiner* — Wae L Louie
(74) *Attorney, Agent, or Firm* — Lorenz & Kopf, LLP

(57) ABSTRACT

Systems and method are provided for controlling an autonomous vehicle. In one embodiment, a method for controlling an autonomous vehicle comprises obtaining lidar data from one or more lidar sensors disposed on the autonomous vehicle during operation of the autonomous vehicle, generating a lidar point cloud using the lidar data, making an initial determination, via a processor onboard the autonomous vehicle, of a possible lidar point cloud anomaly based on a comparison of the lidar point cloud with prior lidar point cloud information stored in memory, receiving a notification from a remote module as to whether the possible lidar point cloud anomaly is a confirmed lidar point cloud anomaly, and taking one or more vehicle actions when there is a confirmed lidar point cloud anomaly.

20 Claims, 7 Drawing Sheets

METHODS AND SYSTEMS FOR LIDAR POINT CLOUD ANOMALIES

TECHNICAL FIELD

The present disclosure generally relates to vehicles, and more particularly relates to systems and methods pertaining to lidar cloud anomalies for vehicles, such as for autonomous vehicles.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be desirable for improved operation of autonomous vehicles, such as usage of lidar point cloud data.

Accordingly, it is desirable to provide systems and methods for usage of lidar point cloud data.

SUMMARY

Systems and methods are provided for controlling an autonomous vehicle. In one embodiment, a method for controlling an autonomous vehicle comprises obtaining lidar data from one or more lidar sensors disposed on the autonomous vehicle during operation of the autonomous vehicle, generating a lidar point cloud using the lidar data, making an initial determination, via a processor onboard the autonomous vehicle, of a possible lidar point cloud anomaly based on a comparison of the lidar point cloud with prior lidar point cloud information stored in memory, receiving a notification from a remote module as to whether the possible lidar point cloud anomaly is a confirmed lidar point cloud anomaly, and taking one or more vehicle actions when there is a confirmed lidar point cloud anomaly.

In one embodiment, a system for controlling an autonomous vehicle comprises a remote computer module and an autonomous vehicle computer module. The autonomous vehicle computer module is configured to at least facilitate obtaining lidar data from one or more lidar sensors disposed on the autonomous vehicle during operation of the autonomous vehicle, generating a lidar point cloud using the lidar data, and making an initial determination, via a processor onboard the autonomous vehicle, of a possible lidar point cloud anomaly based on a comparison of the lidar point cloud with prior lidar point cloud information stored in memory. The remote computer module is disposed remote from the autonomous vehicle, and is configured to at least facilitate confirming the possible lidar point cloud anomaly. The autonomous vehicle computer module is further configured to at least facilitate receiving a notification from the remote computer module as to whether the possible lidar point cloud anomaly is a confirmed lidar point cloud anomaly, and taking one or more vehicle actions when there is a confirmed lidar point cloud anomaly.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
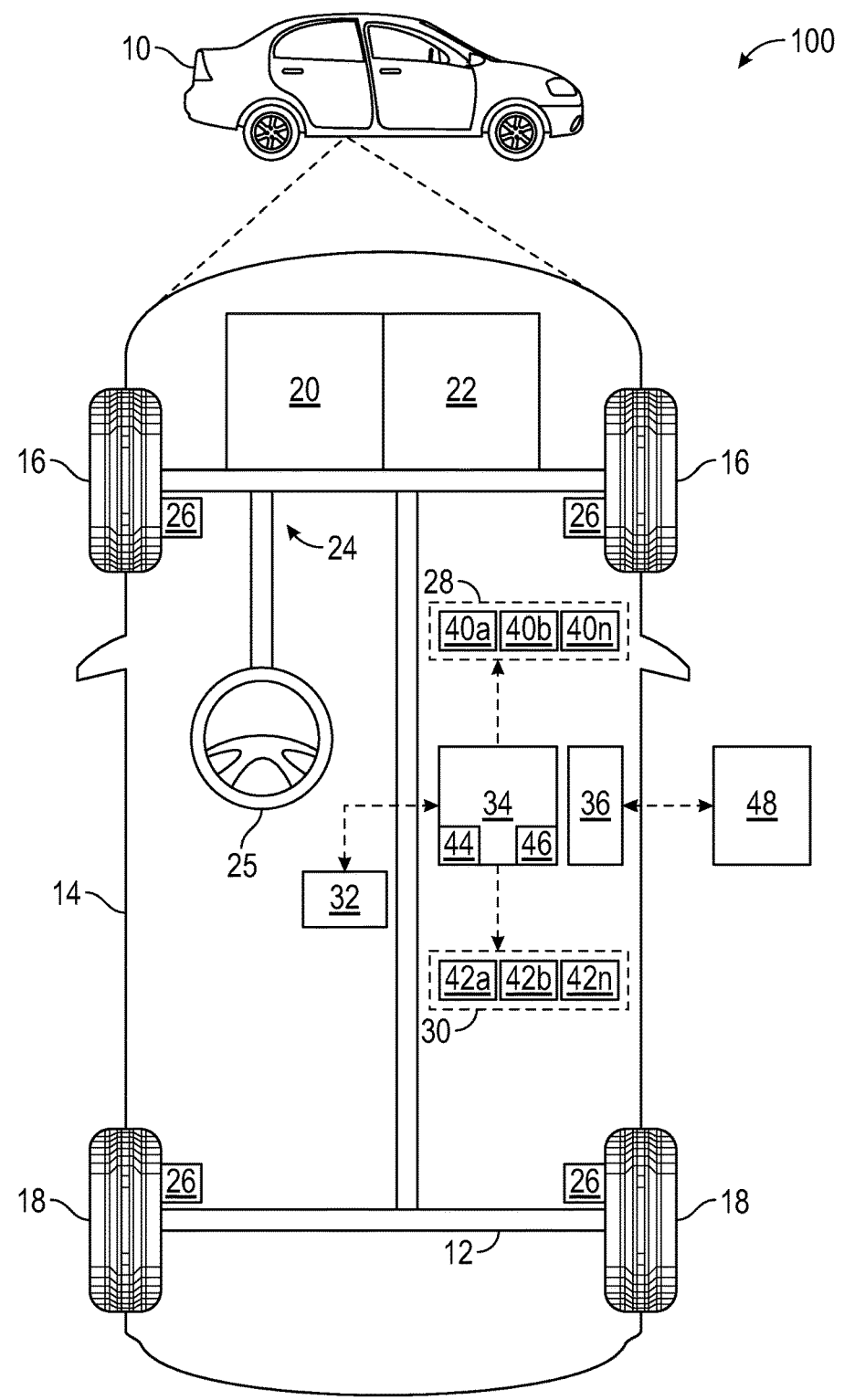
FIG. 1 is a functional block diagram illustrating an autonomous vehicle, in accordance with various embodiments.

With reference to FIG. 1, a lidar implementation system 100 shown generally as 100 is associated with a vehicle 10 in accordance with various embodiments. In general, the lidar implementation system (or simply "system") 100 provides lidar-based assistance for the vehicle 10 under appropriate circumstances, including the detection and treatment of lidar cloud anomalies for lidar data collected by the vehicle 10. As used throughout this Application, unless noted otherwise, the terms "remote user", "remote operator", and "remote individual" shall refer to a remote human individual that is disposed remote of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the lidar implementation system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores lidar-related data pertaining lidar data history and rules for interpreting lidar clouds using the lidar data. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in providing lidar-based assistance for the vehicle 10 under appropriate circumstances, including the detection and treatment of lidar cloud anomalies for lidar data collected by the vehicle 10.

Figure 2:
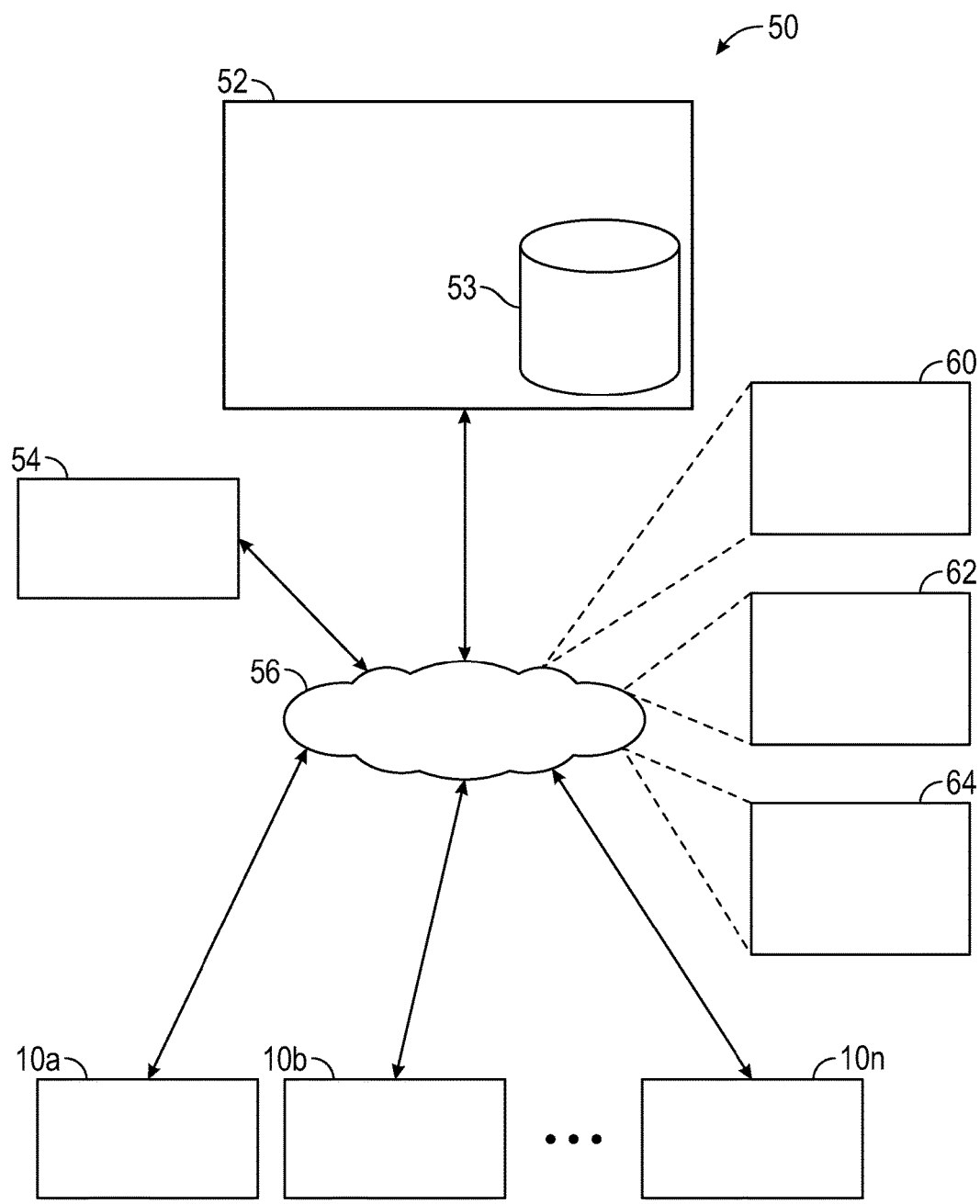
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
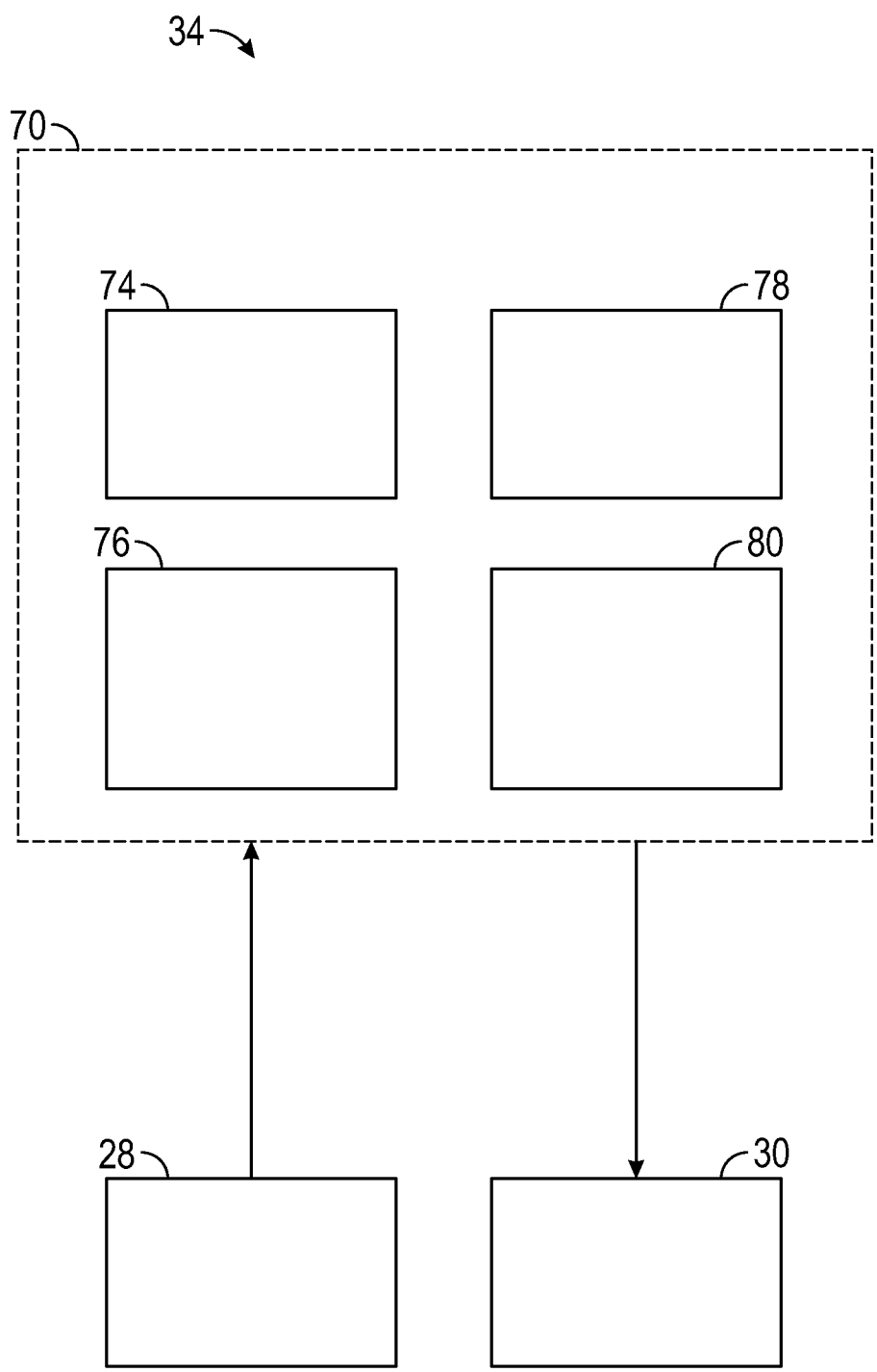
FIG. 3 is functional block diagram illustrating an autonomous driving system (ADS) associated with an autonomous vehicle, in accordance with various embodiments.

In accordance with various embodiments, controller 34 implements an autonomous driving system (ADS) as shown in FIG. 3. That is, suitable software and/or hardware components of controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

With reference back to FIG. 1, in various embodiments, one or more instructions of the controller 34 are embodied in the lidar implementation system 100 of FIG. 1. As mentioned briefly above, the lidar implementation system 100 of FIG. 1 provides lidar-based assistance for the vehicle 10 under appropriate circumstances, including the detection and treatment of lidar cloud anomalies for lidar data collected by the vehicle 10.

Figure 4:
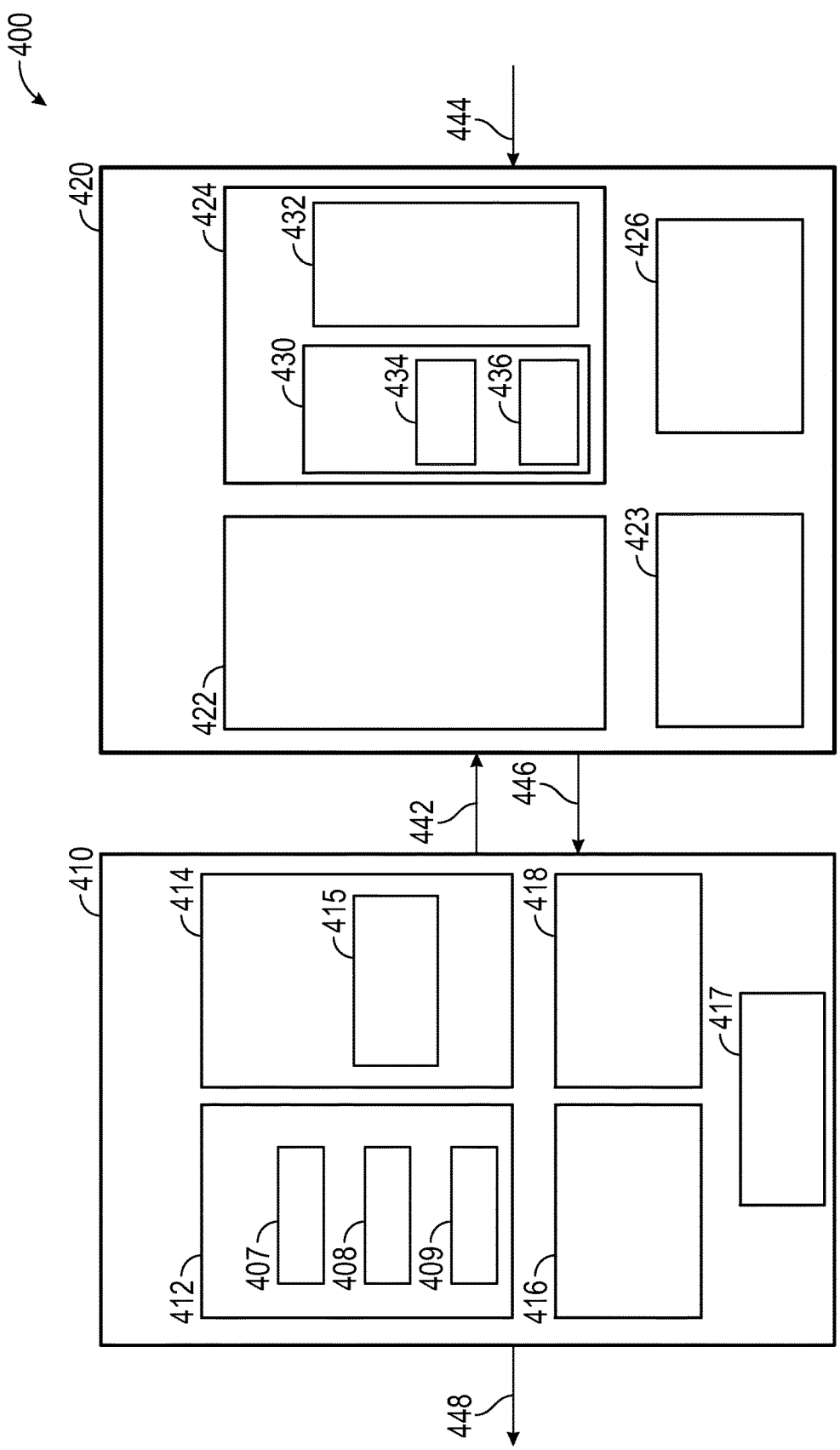
FIG. 4 is a dataflow diagram illustrating a lidar assistance system for autonomous vehicles, in accordance with various embodiments.

Referring to FIG. 4, an exemplary lidar implementation system 400 generally includes an autonomous vehicle computer module 410 and a remote computer module 420. In the depicted embodiment, the autonomous vehicle computer module 410 is disposed onboard the vehicle 10, for example as part of the controller 34 of FIG. 1 and/or one or more other associated computer systems and/or devices. Also in the depicted embodiment, the remote computer module 420 is disposed remote from the vehicle 10, for example as part of the autonomous vehicle based remote transportation system 52 of FIG. 2. In various embodiments, the autonomous vehicle computer module 410 provides lidar cloud data and preliminary analysis thereof regarding a possible lidar cloud anomaly, and the remote computer module 420 provides confirmation of, and assistance pertaining to, the lidar cloud anomaly.

In various embodiments, the autonomous vehicle computer module 410 includes one or more sensors 412, interfaces 414, processors 416, memory devices (or memory) 417, and transceivers 418. As noted above, in various embodiments, the autonomous vehicle computer module 410 provides lidar cloud data and preliminary analysis thereof regarding a possible lidar cloud anomaly.

In certain embodiments, the sensors 412 pertain to sensors 40a, 40b, . . . 40n of FIG. 1, and include one or more lidar sensors 407, cameras 408, and/or other sensors 409. In various embodiments, the lidar sensors 407 are mounted at various locations of the body of the vehicle 10, and generate lidar data points pertaining to the vehicle's surroundings (e.g., the roadway, other vehicles, pedestrians, bicyclists, animals, trees, rocks, telephone poles, buildings walls, and other objects). Also in various embodiments, the cameras 408 are mounted at various locations of the body of the vehicle 10, and generate photographic and/or video footage of the surroundings around the vehicle (e.g., including front view video footage in front of the vehicle 10, rear view footage behind the vehicle 10, driver side footage beyond the driver's side of the vehicle 10, and passenger side footage to the passenger's side footage beyond the passenger's side of the vehicle 10). Also in certain embodiments, the other sensors 409 are disposed at various locations of the vehicle 10, and provide additional information regarding the vehicle 10 and/or its operation and/or surroundings (e.g., radar and sonar sensors for detecting and monitoring objects in proximity to the vehicle 10, wheel speed sensors for detecting wheel speed of the vehicle 10, and so on).

In certain embodiments, the interface 414 is used to communication with an individual inside the vehicle 10. For example, in certain embodiments, the interface 414 includes one or more input devices 415 (e.g., a touch screen) for receiving inputs from a passenger of the vehicle 10 as to a desired location for travel (in certain embodiments, the interface 414 may also receive such information from the user device 54 of FIG. 2).

Also in certain embodiments, the processor 416 is utilized to process information obtained via the sensors 412 and/or the interface 414. In various embodiments, the processor 416 analyzes a lidar point cloud using lidar data from the lidar sensors 407 for possible anomalies with respect to the lidar point cloud. Also in various embodiments, the memory 417 stores data pertaining to prior data history for the vehicle 10 (and/or for other vehicles 10a, 10b, . . . 10n of FIG. 2) and/or lidar data interpretation rules, for retrieval and use by the processor 416 in analyzing the lidar point cloud. Also in various embodiments, the processor 416 plans a route of travel for the vehicle 10 using the data obtained from the sensors 412 (lidar and object-detection data) and the interface 414 (e.g., including user inputs as to a desired destination), and also implements assistance (e.g., in adjusting the route) provided by the remote computer module 420.

In addition, in various embodiments, the transceiver 418 facilitates communication between the autonomous vehicle computer module 410 and the remote computer module 420. For example, in certain embodiments, the transceiver 418 provides data to the remote computer module 420 regarding a possible anomaly in the lidar point cloud. In certain embodiments, the transceiver 418 provides lidar point cloud data from the lidar sensors 407, along with an initial analysis pertaining thereto from the processor 416, video footage (e.g., footage obtained from various cameras 408 with various views around the vehicle 10), and related information (e.g., regarding operation of various vehicle systems and/or detected objects, as obtained by the other sensors 409) to the remote computer module 420. Also in certain embodiments, the transceiver 418 receives manual instructions via the remote computer module 420. In various embodiments, the transceiver 418 communicates with the remote computer module 420 via the communication network 56 of FIG. 2 (e.g., via one or more wireless carriers and/or systems thereof).

In various embodiments, the remote computer module 420 includes one or more processors 422, memory storage devices (or memory) 423, interfaces 424, and/or transceivers 426 as depicted in FIG. 4. In various embodiments, the remote computer module 420 confirms an anomaly with respect to the lidar point cloud, and provides assistance with respect to the anomaly for operation of the vehicle 10.

In certain embodiments, the processor 422 determines whether or not a possible lidar cloud anomaly is present (after receiving notification of a possible lidar point cloud anomaly from the autonomous vehicle computer module 410). In certain embodiments, this determination is made automatically via the processor 422. In other embodiments, the processor 422 makes this determination based on inputs from a remote user (e.g., that is disposed remote from the vehicle 10 via the interface 424.

In certain embodiments, the memory 423 includes data used for confirming the anomaly, and/or for determining future lidar point cloud anomalies, and/or for means of assistance with respect to lidar point cloud anomalies. For example, in certain embodiments, the memory 423 stores data pertaining to various vehicles (e.g., vehicles 10a, 10b, . . . 10n of FIG. 2), lidar data interpretation rules, and/or data for used in providing assistance in the event of a lidar point cloud anomaly (e.g., including a list of roadways that may be "blacklisted", for which vehicles are prohibited from or discouraged from travelling, at least for a period of time).

In various embodiments, the interface 424 facilitates the issuance of manual inputs provided by a remote, human operator for the expert mode. For example, in various embodiments, the interface 424 provides the remote operator with data pertaining to the current operation of the vehicle 10 (including video footage, any associated audio, and systems operational data) via a display 430. In various embodiments, the display 430 includes a visual component 434, such as a display screen (e.g., an LCD display screen). Also in certain embodiments, the display 430 may also include an audio component 436 (e.g., with associated audio for the video footage, and/or for an audio description of the possibility of expert mode implementation, and so on). In addition, in various embodiments, the interface 424 also includes one or more input devices 432 (e.g., including joysticks, keyboards, touch screens, steering wheels, computer mice, microphones, and so on) for the remote user to provide inputs, for example to assist with confirmation of the lidar point cloud anomaly and/or with the providing of assistance in view of the lidar point cloud anomaly, and so on.

Also in various embodiments, the transceiver 426 facilitates communication between the remote computer module 420 and the autonomous vehicle computer module 410. For example, in certain embodiments, the transceiver 426 provides confirmation of the lidar point cloud anomaly, along with instructions for assistance in view of the lidar point cloud anomaly, to the autonomous vehicle computer module 410.

With further reference to FIG. 4, in various embodiments outputs 442 from the autonomous vehicle computer module 410 serve as inputs for the remote computer module 420. In various embodiments, such outputs 442 from the autonomous vehicle computer module 410 include lidar point cloud data, video footage from various views surrounding the vehicle 10, other sensor data (e.g., pertaining to obstacles detected in proximity to the vehicle 10 and/or movement of the vehicle 10 and/or the obstacles), initial determinations from the processor 416 with respect to the lidar point cloud, and/or various other types of information, for example as provided via the transceiver 418.

Also with further reference to FIG. 4, the remote computer module 420 also receives additional inputs 444 from a remote user. In various embodiments, the additional inputs 444 include the remote user's confirmation of the lidar point cloud anomaly. In certain embodiments, the additional inputs 444 may also include inputs from the remote user pertaining to recommended assistance in view of the lidar point cloud anomaly (e.g., if the user recommends that the vehicle 10 avoid a particular roadway, and so on). The remote computer module 420 provides outputs 446 that include, in various embodiments, confirmation of the lidar point cloud anomaly, along with instructions for assistance in view of the lidar point cloud anomaly (e.g., a recommendation to avoid a particular roadway, and/or a list of particular roadways to avoid, and so on), that serve as inputs for the autonomous vehicle computer module 410. Also in various embodiments, the autonomous vehicle computer module 410 ultimately provides outputs 448 (e.g., to the transmission system 22, steering system 24, brake system 26, actuator system 30 of FIG. 1, and/or other vehicle systems) for control of the vehicle 10 in accordance with the assistance instructions, for travel of the vehicle along an alternate path or route (the terms "path" and "route" are intended to be synonymous for the purposes of this Application).

Figure 5:
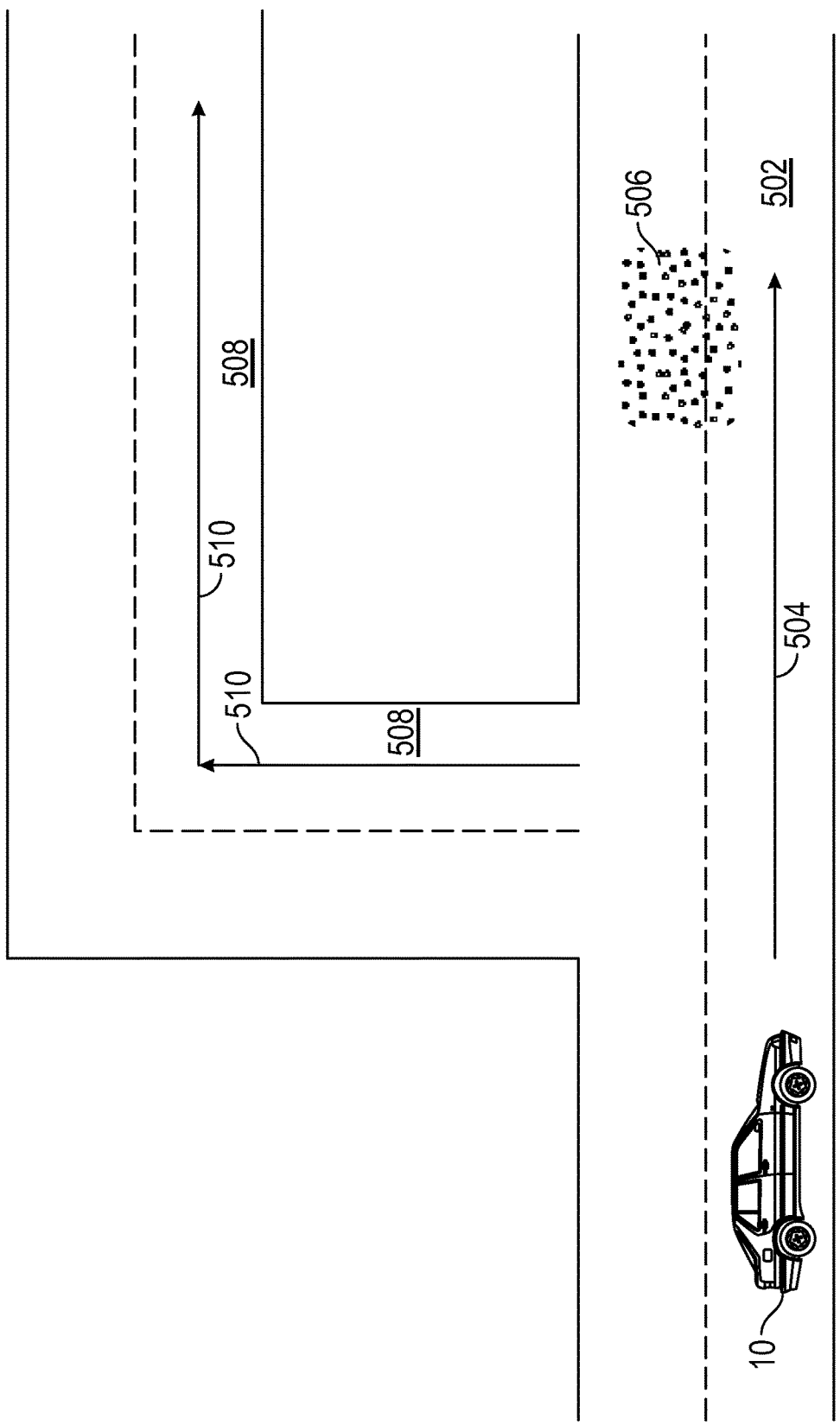
FIG. 5 is a schematic diagram of a an autonomous vehicle on a roadway pertaining to a lidar point cloud anomaly, in accordance with various embodiments.

Turning now to FIG. 5, a schematic diagram is provided of the autonomous vehicle 10, in accordance with various embodiments. In the depicted embodiment, the vehicle 10 is currently travelling along a first roadway 502 via an initial path 504. A lidar point cloud 506 is detected along the first roadway 502 for analysis by the autonomous vehicle computer module 410 and the remote computer module 420 of FIG. 4. If an anomaly is determined to exist with respect to the lidar point cloud 506 that warrants a change in the path of the vehicle 10 (e.g., in some embodiments, a construction site, an emergency scene, emergency vehicles, traffic jams, stationary vehicles or other objects, a marathon, other race or event, or other grouping of bicyclists or pedestrians, other roadway blockages, and so on), then the vehicle 10 may be directed to travel on a second roadway 508 via an alternate path 510.

Figure 6A:
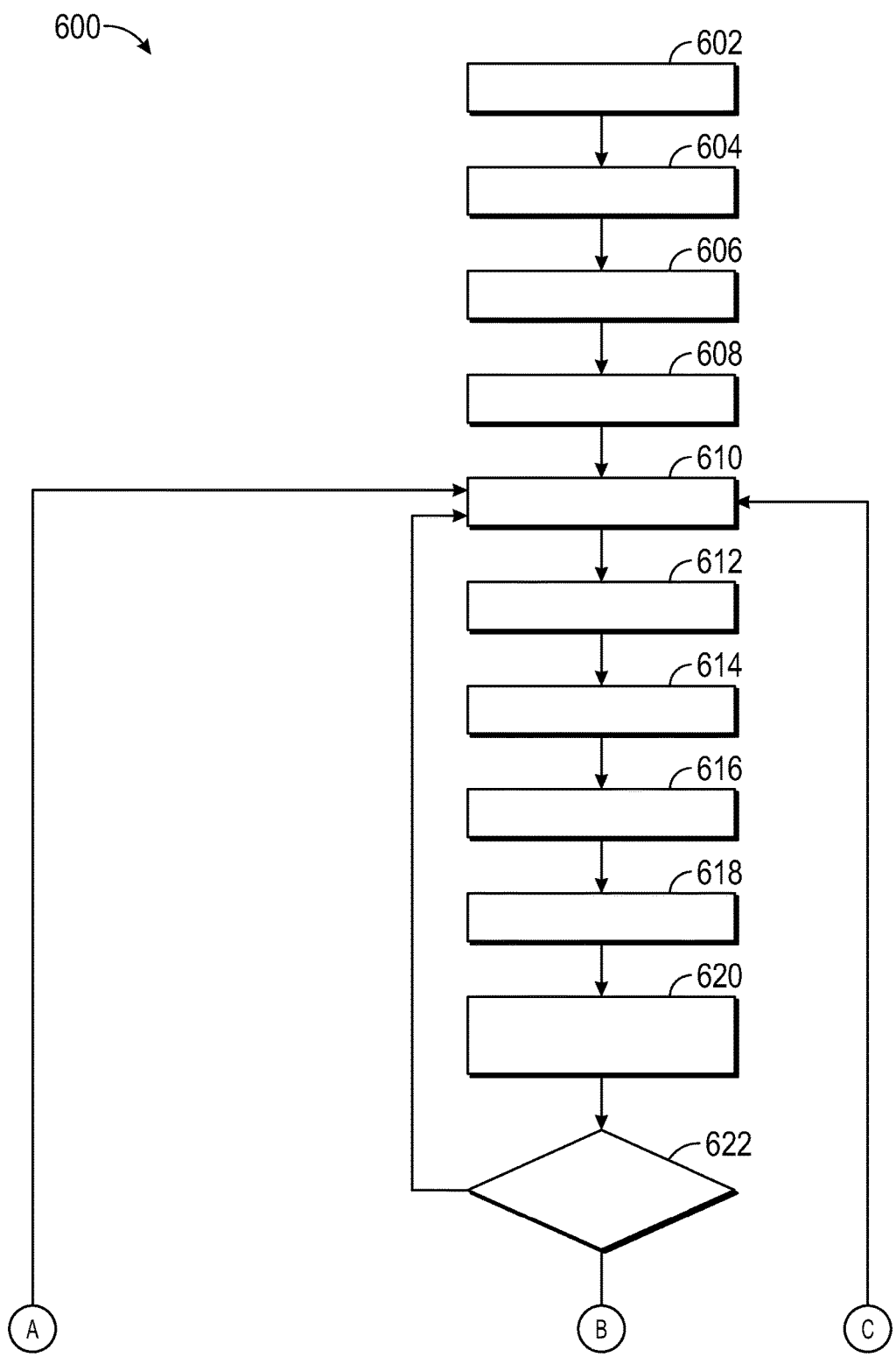
FIG. 6 is a flowchart for a control process for addressing lidar point cloud anomalies, in accordance with various embodiments.
Figure 6B:
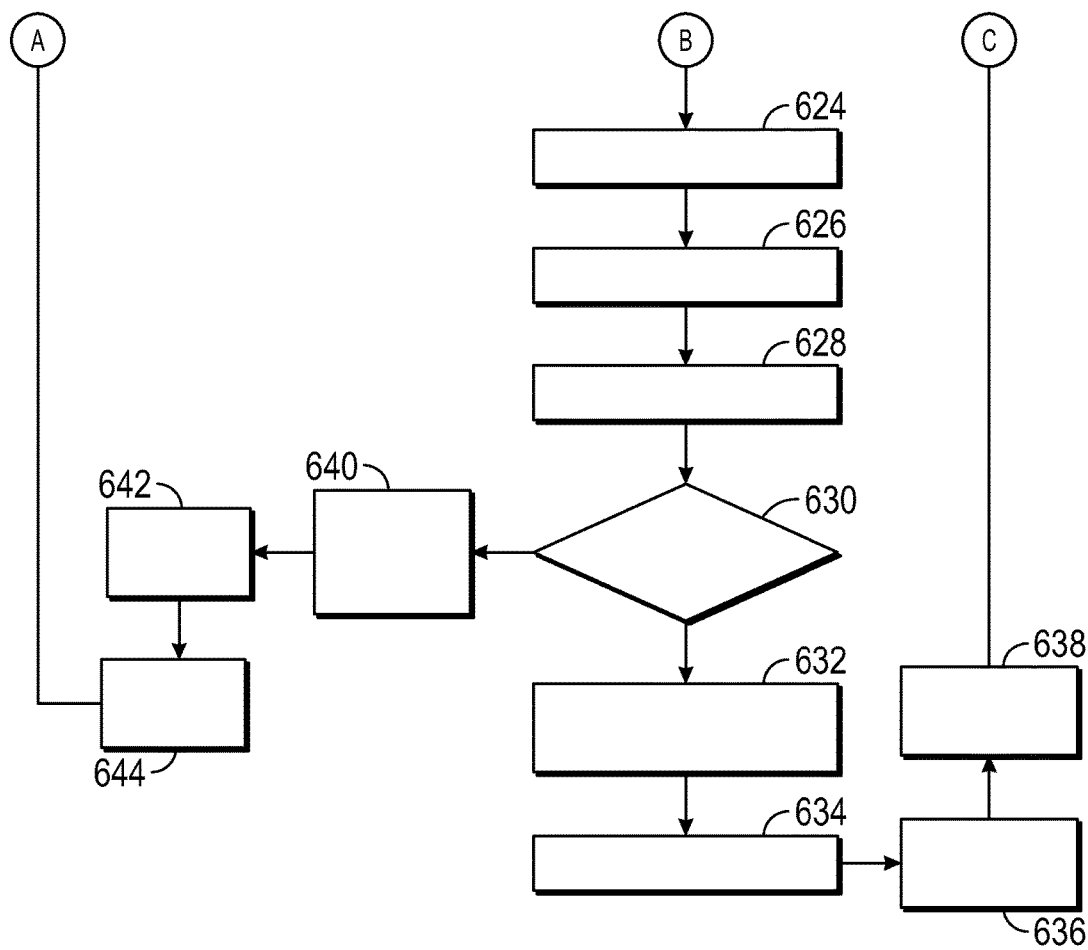

Referring now to FIG. 6, a flowchart is provided for a control method 600 for addressing lidar point cloud anomalies, in accordance with various embodiments. The control method 600 is discussed below in connection with FIG. 6 as well as continued reference to FIGS. 1-5. In various embodiments, the control method 600 can be performed by the system 100 and the associated implementations of FIGS. 1-5, in accordance with exemplary embodiments. As can be appreciated in light of the disclosure, the order of operation within the method is not limited to the sequential execution as illustrated in FIG. 6, but may be performed in one or more varying orders as applicable and in accordance with the present disclosure. In various embodiments, the control method 600 can be scheduled to run based on one or more predetermined events, and/or can run continuously during operation of the autonomous vehicle 10.

In various embodiments, the control method 600 may begin at 602. In various embodiments 602 occurs when an occupant is within the vehicle 10 and the vehicle 10 begins operation in an automated manner.

In certain embodiments, passenger inputs are obtained at 604. In various embodiments, the passenger inputs pertain to a desired destination for travel via the vehicle 10. In various embodiments, the user inputs may be obtained via the input device 415 of FIG. 4 and/or the user device 54 of FIG. 2.

Map data is obtained at 606. In various embodiments, map data is retrieved from a memory, such as the data storage device 32 of FIG. 1 onboard the vehicle 10 and/or the remote route database 53 of the autonomous vehicle based remote transportation system 52 of FIG. 2. Also in various embodiments, the map data comprises maps and associated data pertaining to roadways that are near the vehicle 10 and/or that are near or on the way from the vehicle 10's current to its destination (e.g., per the passenger inputs).

An initial path for the autonomous vehicle is generated and implemented at 608. In various embodiments, the initial path is generated and implemented via the ADS 70 of FIG. 3 for the vehicle 10 of FIG. 1 using the passenger inputs of 604 and the map data of 606, for example via automated instructions provided by the processor 416. In various embodiments, the initial path of 608 comprises a path of movement of the vehicle 10 that would be expected to facilitate movement of the vehicle 10 to the intended destination while maximizing an associated score and/or desired criteria (e.g., minimizing driving time, maximizing safety and comfort, and so on). It will be appreciated that in various embodiments the initial path may also incorporate other data, for example lidar and/or other sensor data discussed below.

Lidar data is obtained at 610. In various embodiments, lidar data is obtained via the lidar sensors 407 of FIG. 4 at various points of time during operation of the vehicle 10, preferably in a continuous manner. Also in various embodiments, the lidar data comprise various lidar data points from areas (including a roadway) surrounding the vehicle 10 during operation of the vehicle 10. In various embodiments, the lidar data is provided to the processor 416 of FIG. 4 for processing.

Camera data is obtained at 612. In various embodiments, camera data is obtained via the cameras 408 of FIG. 4 at various points of time during operation of the vehicle 10, preferably in a continuous manner. Also in various embodiments, the camera data includes video footage surrounding the vehicle 10, including a front view in front of the vehicle 10, a rear view behind the vehicle 10, a driver side view beyond the driver side of the vehicle 10, and a passenger side view beyond the passenger side of the vehicle 10.

Other sensor data is obtained at 614. In various embodiments, other sensor data is obtained via the other sensors 409 of FIG. 4 at various points of time during operation of the vehicle 10, preferably in a continuous manner. Also in various embodiments, the other sensor data includes additional information regarding the vehicle 10 and/or its operation and/or surroundings (e.g., radar and sonar sensors for detecting and monitoring objects in proximity to the vehicle 10, wheel speed sensors for detecting wheel speed of the vehicle 10, and so on).

Data is retrieved from memory at 616. In various embodiments, the processor 416 of FIG. 4 retrieves data from the memory 417 of FIG. 4 that includes lidar-related data pertaining lidar data history and rules for interpreting lidar clouds using the lidar data.

Lidar point clouds are generated at 618. In various embodiments, the lidar point clouds represent a collection of data points from the lidar data of 610, as obtained via the lidar sensors 407 of FIG. 4 onboard the vehicle 10 during operation of the vehicle 10. In various embodiments, the lidar point clouds may also be generated at least in part by the processor 416 of FIG. 4 using data from the lidar sensors 407 of FIG. 4.

Analysis is performed with respect to the lidar point clouds at 620. In certain embodiments, the processor 416 of FIG. 4 onboard the vehicle 10 compares the lidar point clouds of 610 with previously analyzed and/or known point clouds, and/or known lidar point cloud rules, as obtained at 616. Also in certain embodiments, such prior and/or known lidar point cloud histories and/or rules may pertain, by way of example, to construction sites, emergency scenes, emergency vehicles, traffic jams, stationary vehicles or other objects, marathons, other races or events, or other groupings of bicyclists or pedestrians, other roadway blockages, and so on.

A determination is made at 622 as to whether a potential lidar point cloud anomaly is present. In various embodiments, the processor 416 of FIG. 4 determines that a potential lidar point cloud anomaly is present when the existing lidar point clouds resembles (e.g., has various points, patterns, and/or other characteristics in common with) one or prior and/or known lidar point cloud histories that pertain to anomalies and/or that may warrant a change in path for the vehicle 10 (e.g., pertaining to construction sites, emergency scenes, emergency vehicles, traffic jams, stationary vehicles or other objects, marathons, other races or events, or other groupings of bicyclists or pedestrians, other roadway blockages, and so on).

In certain embodiments, one or more convolutional neural network (CNN) models are used (e.g., at 618-622) as classifiers for detected point cloud objects with the objective of determining anomalies. For example, in certain embodiments, one or more CNN models are used by the processor 416 to pre-classify objects that are detected as part of the lidar point cloud, for use in determining anomalies. For example, in certain embodiments, the CNN may receive lidar data (e.g., including input images) pertaining to objects in the lidar data point cloud; implement a convolutional phase for the lidar data (e.g., using an appropriately sized convolutional filter that produces a set of feature maps corresponding to smaller tilings of the input images); perform feature extraction and subsampling (e.g., producing a set of smaller feature maps that are effectively "smoothed" to reduce sensitivity of the convolutional filters to noise and other variations); perform another convolution (e.g., to produce a large set of smaller feature maps that are then subsampled); and ultimately provide the classification (or pre-classification) of the objects (e.g., by processing the feature maps to produce a first layer, followed by a fully-connected layer, from which classification outputs are produced). Also in certain embodiments, the CNN may be previously trained (e.g. as part of a fleet of vehicles) in a supervised mode by presenting it with a large number (i.e., a "corpus") of input images and "clamping" outputs based on objects that may be present within the scene during the training of the CNN. Also in certain embodiments, back-propagation, as is known in the art, may be used to refine the training of the CNN, and the resulting module can then be implemented as part of one or both of the autonomous vehicle computer module 410 and/or the remote computer module 420 of FIG. 4. Also in certain embodiments, subsequently, during normal operation, the trained CNN can be used to process lidar data and images received as the vehicle 10 moves through its environment for use in determining lidar point cloud anomalies.

A request is made for assistance at 624. In various embodiments, the processor 416 of the autonomous vehicle computer module 410 of FIG. 4 provides instructions for the transmission of a message via the transceiver 418 of FIG. 4 to the transceiver 426 of the remote computer module 420 of FIG. 4 with a notification that a potential lidar cloud anomaly has been detected. Also, in various embodiments, this notification is part of the outputs 442 of FIG. 4 from the autonomous vehicle computer module 410 to the remote computer module 420.

Vehicle information is provided at 626 from the autonomous vehicle computer module 410 to the remote computer module 420 via transceivers 418, 426 (e.g., corresponding to outputs 442 of FIG. 4). In various embodiments, the transmitted information includes the lidar point clouds (e.g., including one or more images thereof), any preliminary analysis thereof, video feeds including video footage of in front of, behind, to the passenger side, and to the driver side of the vehicle, object detection information pertaining to any obstacles in the path of or otherwise in proximity to the vehicle 10, and vehicle system and operational information (e.g., including the initial path, the lanes, a centerline of the current lane, the lane markers, vehicle speed and gear data, data as to any error messages, and the like), and/or any other pertinent information and data.

In various embodiments, the processor 416 of the autonomous vehicle computer module 410 of FIG. 4 provides instructions for the transmission of the information of 626 via the transceiver 418 of FIG. 4 to the transceiver 426 of the remote computer module 420 of FIG. 4 with a notification that a potential lidar cloud anomaly has been detected. Also, in various embodiments, this transmission is part of the outputs 442 of FIG. 4 from the autonomous vehicle computer module 410 to the remote computer module 420.

In addition, in various embodiments, the video feeds and data of 626 are displayed for a remote operator (e.g., at the autonomous vehicle based remote transportation system 52 of FIG. 2) via the display 430 of FIG. 4. Also in various embodiments, the video feeds and information are provided throughout the process, preferably continuously.

Remote analysis is provided at 628. In various embodiments, the remote analysis is facilitated via the remote computer module 420 of FIG. 4. Specifically, in certain embodiments, one or more input devices 415 of FIG. 4 receive inputs at 628 that are provided manually from the remote operator for confirmation of the lidar point cloud anomaly (e.g., by manually clicking a box or other indication as to whether the potential lidar point cloud anomaly has been confirmed, after the remote operator has viewed the lidar point cloud images and the video feeds and additional information provided at 626). For example, in certain embodiments, the remote operator provides confirmation that the potential lidar point cloud anomaly corresponds to a situation in which it may be desirable for the vehicle 10 to avoid the roadway, such as a situation pertaining to construction sites, emergency scenes, emergency vehicles, traffic jams, stationary vehicles or other objects, marathons, other races or events, or other groupings of bicyclists or pedestrians, other roadway blockages, and so on. Also in various embodiments, the remote user inputs correspond to the inputs 444 for the remote computer module 420 of FIG. 4. In addition, in certain embodiments, the confirmation of the lidar point cloud anomaly corresponds to outputs 446 of FIG. 4 from the remote computer module 420 to the autonomous vehicle computer module 410 of FIG. 4.

In certain other embodiments, the processor 422 of FIG. 4 may automatically confirm, at 628, the lidar point cloud anomaly by comparing the lidar point cloud anomaly with different lidar point cloud rules from the memory 423 of FIG. 4. For example, in certain embodiments, the processor 422 may automatically determine, based on a comparison with the current potential lidar point cloud anomaly with the retrieved lidar point cloud rules, that the current roadway has a situation that may warrant the vehicle 10 to avoid the roadway (e.g., in the case of construction sites, emergency scenes, emergency vehicles, traffic jams, stationary vehicles or other objects, marathons, other races or events, or other groupings of bicyclists or pedestrians, other roadway blockages, and so on). In certain embodiments, artificial intelligence (AI) may be utilized by the processor 422 for the comparisons and determinations.

A determination is then made at 630 as to whether the anomaly has been confirmed. In various embodiments, the determination is made by the processor 422 of FIG. 4 based on the inputs from the remote operator at 628. In certain other embodiments, this determination may be made automatically by the processor 422.

If it is determined that the anomaly has been confirmed, then a confirmation flag is set at 632. The confirmation flag serves as a notice that a lidar point cloud anomaly has been confirmed, for example so that any appropriate assistance may be provided. In certain embodiments, the confirmation flag is set by the processor 422 of FIG. 4 and stored in the memory 423 of FIG. 1 of the remote computer module 420. In certain embodiments, the confirmation flag is set by the processor 416 of FIG. 4 and stored in the memory 417 of FIG. 1 of the autonomous vehicle computer module 410.

In addition, one or more databases are updated at 634. In various embodiments, the processor 422 of the remote computer module 420 of FIG. 4 updates the memory 423 of FIG. 4, and/or the route database 53 of FIG. 2, with information as to the lidar point cloud anomaly, and its potential effect on the roadway on which the lidar point cloud anomaly has been detected (e.g., the roadway on which the vehicle 10 has been travelling). For example, in various embodiments, the route database 53 of FIG. 2 is updated so that additional vehicles in a fleet (e.g., corresponding to vehicles 10a, 10b, . . . 10n of FIG. 2) can utilize the information pertaining to the lidar point cloud anomaly as appropriate. For example, in certain embodiments, if the conditions are likely to be encountered by other vehicles travelling along the same roadway, then such information may be helpful in facilitating implementation of the data for other such vehicles (e.g., if encountering an obstacle that remains in the roadway for an extended period of time, and/or for a traffic light that is not functioning for an extended period of time, and/or for a construction zone, and so on). For example, in certain embodiments, roadways that include such lidar point cloud anomalies may be "blacklisted", such that the vehicles 10a, 10b, . . . 10n of FIG. 2 will be prevented or discouraged from taking routes that include such blacklisted roadways in the future, or at least so long as such roadways remain on the "blacklist" (e.g., as long as such roadways include a lidar point cloud anomaly).

Assistance instructions are provided at 636. In various embodiments, the processor 422 of the remote computer module 420 of FIG. 4 provides an alternate route for the vehicle 10 to travel (e.g., corresponding to the alternate path 510 of the alternate roadway 508 of FIG. 5), in view of the lidar point cloud anomaly. In certain other embodiments, the processor 422 of the remote computer module 420 of FIG. 4 instead provides parameters for an alternate route for the vehicle 10 to travel, in view of the lidar point cloud anomaly. For example, in certain embodiments, the vehicle 10 may be instructed to select an alternate route (e.g., corresponding to the alternate path 510 of the alternate roadway 508 of FIG. 5) that does not include the current roadway for which the lidar point cloud anomaly has been confirmed. In addition, in certain embodiments, the vehicle 10 may be instructed to select an alternate route that does not include any of the "blacklisted" roadways (e.g., for which a lidar point cloud anomaly has been confirmed using data provided by the current vehicle 10 and/or one or more other vehicles 10a, 10b, . . . 10n of FIG. 2). Also in various embodiments, the assistance comprises instructions provided by the processor 422 of the remote computer module 420 of FIG. 4 via the transceiver 426 of FIG. 4 to the autonomous vehicle computer module 410 of FIG. 4. In addition, also in various embodiments, the assistance/instructions of 636 correspond to the outputs 446 of FIG. 4 provided from the remote computer module 420 to the autonomous vehicle computer module 410 of FIG. 4.

The assistance instructions are implemented at 638. Specifically, in various embodiments, the processor 416 of the autonomous vehicle computer module 410 of FIG. 4 implements the assistance and/or instructions provided by the remote computer module 420 of FIG. 1n certain embodiments, the processor 416 implements an alternate path for the vehicle 10 (e.g., corresponding to the alternate path 510 of the alternate roadway 508 of FIG. 5) as provided by the remote computer module 420 of FIG. 4. In certain other embodiments, the processor 416 generates and implements an alternate path for the vehicle 10 using parameters provided by the remote computer module 420 of FIG. 4 (e.g., by avoiding the current roadway with the lidar point cloud anomaly, and/or by avoiding other blacklisted roadways for which lidar point cloud anomalies have been detected with respect to one or more other vehicles, and so on). In various embodiments, the processor 416 of FIG. 4 implements the alternate route(s) by providing instructions for various vehicle systems (e.g., to the transmission system 22, steering system 24, brake system 26, actuator system 30 of FIG. 1, and/or other vehicle systems) to implement the alternate route (e.g., corresponding to outputs 448 of FIG. 4).

The process then returns to 610 as additional data is collected, preferably continuously. The process then proceeds, beginning with 610, with the confirmation flag remaining set (until a further determination is made, for example at 622 or 630, that there is no longer a lidar point cloud anomaly).

With reference again to 630, if it is determined at 630 that a lidar point cloud anomaly has not been confirmed, then a false positive flag is set at 640. The false positive flag serves as a notice that a lidar point cloud anomaly has not been confirmed, despite the possibility of an anomaly from 622. In certain embodiments, the false positive flag is set by the processor 422 of FIG. 4 and stored in the memory 423 of FIG. 1 of the remote computer module 420. In certain embodiments, the false positive flag is set by the processor 416 of FIG. 4 and stored in the memory 417 of FIG. 1 of the autonomous vehicle computer module 410.

One or more databases in memory are updated at 642. In various embodiments, the processor 422 of the remote computer module 420 of FIG. 4 updates the memory 423 of FIG. 4, and/or the route database 53 of FIG. 2, with information as to the false positive results with respect to the potential lidar point cloud anomaly. For example, in various embodiments, the route database 53 of FIG. 2 is updated so that additional vehicles in a fleet (e.g., corresponding to vehicles 10a, 10b, . . . 10n of FIG. 2) can utilize the information pertaining to the false positive results as appropriate (e.g., by incorporating the false positive results for the lidar point cloud rules for use in analyzing other future lidar point cloud anomalies as appropriate). For example, in certain embodiments, if similar lidar point cloud information is encountered by other vehicles travelling along the same roadway, then such information may be helpful in recognizing that such information may also lead to a false positive result, and so on.

Continued operation of the vehicle 10 is provided at 644. In various embodiments, the vehicle 10 is allowed to continue along it current path and roadway (e.g., corresponding to the path 504 along roadway 502 of FIG. 5). Also in various embodiments, the processor 422 of the remote computer module 420 of FIG. 4 provides instructions, via the transceiver 426 of FIG. 4, to the autonomous vehicle computer module 410 of FIG. 4, so that the processor 416 of FIG. 4 can maintain the vehicle 10 in moving along the current path of the current roadway.

The process then returns to 610 as additional data is collected, preferably continuously. The process then proceeds, beginning with 610, with the false positive flag remaining set (until a further determination is made, for example at 630, that a lidar point cloud anomaly has been confirmed).

In various embodiments, the disclosed methods and systems provide for detection and treatment of lidar point cloud anomalies. Potential lidar point cloud anomalies are detected by the vehicle 10. The potential lidar point cloud anomalies are confirmed by a remote device (e.g., using manual inputs from a remote operator, in one embodiment). The remote device also provides appropriate assistance for the vehicle 10 (e.g., including re-routing of a vehicle 10 path and/or providing parameters for re-routing the vehicle 10 path) when a lidar point cloud anomaly has been confirmed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an autonomous vehicle, the method comprising:
    obtaining lidar data from one or more lidar sensors disposed on the autonomous vehicle during operation of the autonomous vehicle;
    generating a lidar point cloud using the lidar data;
    making an initial determination, via a processor onboard the autonomous vehicle, using a convolutional neural network model, of a possible lidar point cloud anomaly based on a comparison of the lidar point cloud with prior lidar point cloud information stored in a memory, wherein the autonomous vehicle is determined to have a potential lidar point cloud anomaly when the lidar point cloud is determined to include patterns in common with a known lidar point cloud history from the prior lidar point cloud information for a circumstance that warrants a change in path for the autonomous vehicle;
    receiving a notification from a remote module as to whether the possible lidar point cloud anomaly is a confirmed lidar point cloud anomaly, the confirmed lidar point cloud anomaly comprising a confirmation that a change in path for the autonomous vehicle is warranted; and
    taking one or more vehicle actions when there is a confirmed lidar point cloud anomaly.

2. The method of claim 1, wherein the possible lidar point cloud anomaly is confirmed manually by a remote human operator associated with the remote module.

3. The method of claim 1, wherein the step of making the initial determination comprises making the initial determination, via the processor onboard the autonomous vehicle, based on a determination as to whether one or more patterns of the lidar point cloud are consistent with and shared by one or more known lidar point cloud histories from the prior lidar point cloud information for one or more circumstances that include one or more of the following: a construction site, an emergency scene, an emergency vehicle, a traffic impediment, or a road blockage.

4. The method of claim 3, wherein the step of making the initial determination comprises making the initial determination, via the processor onboard the autonomous vehicle, based on a determination as to whether one or more patterns of the lidar point cloud are consistent with and shared by one or more known lidar point cloud histories from the prior lidar point cloud information for a circumstance that includes a construction site.

5. The method of claim 3, wherein the step of making the initial determination comprises making the initial determination, via the processor onboard the autonomous vehicle, based on a determination as to whether one or more patterns of the lidar point cloud are consistent with and shared by one or more known lidar point cloud histories from the prior lidar point cloud information for a circumstance that includes an emergency scene with an emergency vehicle.

6. The method of claim 3, wherein the step of making the initial determination comprises making the initial determination, via the processor onboard the autonomous vehicle, based on a determination as to whether one or more patterns of the lidar point cloud are consistent with and shared by one or more known lidar point cloud histories from the prior lidar point cloud information for a circumstance that includes a traffic impediment.

7. The method of claim 3, wherein the step of making the initial determination comprises making the initial determination, via the processor onboard the autonomous vehicle, based on a determination as to whether one or more patterns of the lidar point cloud are consistent with and shared by one or more known lidar point cloud histories from the prior lidar point cloud information for a circumstance that includes a road blockage.

8. The method of claim 1, wherein the step of transmitting information comprises:
    transmitting an image of the lidar point cloud, along with video footage of a roadway surrounding the autonomous vehicle, to the remote module.

9. The method of claim 8, wherein the lidar point cloud anomaly is confirmed manually by a human remote operator associated with the remote module based at least in part on the image of the lidar point cloud and the video footage.

10. The method of claim 1, wherein the step of taking one or more vehicle actions comprises taking an alternate route for the autonomous vehicle based on the confirmed lidar point cloud anomaly.

11. The method of claim 10, wherein the step of taking an alternate route comprises taking the alternate route along a roadway that is not on a list of blacklisted roadways based on reported lidar point cloud anomalies.

12. The method of claim 1, wherein the step of taking one or more vehicle actions comprises reporting a current roadway on which the autonomous vehicle is travelling for inclusion on a blacklist for path planning for the autonomous vehicle, one or more other autonomous vehicles, or both.

13. A system for controlling an autonomous vehicle, the system comprising:
an autonomous vehicle computer module configured to at least facilitate, via a processor onboard the vehicle:
obtaining lidar data from one or more lidar sensors disposed on the autonomous vehicle during operation of the autonomous vehicle;
generating a lidar point cloud using the lidar data;
making an initial determination, via a processor onboard the autonomous vehicle, using a convolutional neural network model, of a possible lidar point cloud anomaly based on a comparison of the lidar point cloud with prior lidar point cloud information stored in memory, wherein the autonomous vehicle is determined to have a potential lidar point cloud anomaly when the lidar point cloud is determined to include patterns in common with a known lidar point cloud history from the prior lidar point cloud information for a circumstance that warrants a change in path for the autonomous vehicle; and
a remote computer module disposed remote from the autonomous vehicle and configured to at least facilitate confirming the possible lidar point cloud anomaly, the confirmed lidar point cloud anomaly comprising a confirmation that a change in path for the autonomous vehicle is warranted;
wherein the autonomous vehicle computer module is further configured to at least facilitate:
receiving a notification from the remote computer module as to whether the possible lidar point cloud anomaly is a confirmed lidar point cloud anomaly, the confirmed lidar point cloud anomaly comprising a confirmation that a change in path for the autonomous vehicle is warranted; and
taking one or more vehicle actions when there is a confirmed lidar point cloud anomaly.

14. The system of claim 13, wherein the remote computer module is configured to at least facilitate receiving manual input from a remote human operator that manually confirms the possible lidar point cloud anomaly.

15. The system of claim 13, wherein the autonomous vehicle computer module is configured to at least facilitate taking an alternate route for the autonomous vehicle based on reported lidar point cloud anomalies based on the confirmed lidar point cloud anomaly, and wherein the autonomous vehicle computer module is configured to at least facilitate reporting a current roadway on which the autonomous vehicle is travelling for inclusion on a blacklist for path planning for the autonomous vehicle, one or more other autonomous vehicles, or both.

16. The system of claim 13, wherein the autonomous vehicle computer module is configured to at least facilitate, via the processor onboard the vehicle, making the initial determination based on whether one or more patterns of the lidar point cloud are consistent with and shared by one or more known lidar point cloud histories from the prior lidar point cloud information for one or more circumstances that include one or more of the following: a construction site, an emergency scene, an emergency vehicle, a traffic impediment, or a road blockage.

17. The system of claim 16, wherein the autonomous vehicle computer module is configured to at least facilitate, via the processor onboard the vehicle, making the initial determination based on whether one or more patterns of the lidar point cloud are consistent with and shared by one or more known lidar point cloud histories from the prior lidar point cloud information for a circumstance that includes a construction site.

18. The system of claim 16, wherein the autonomous vehicle computer module is configured to at least facilitate, via the processor onboard the vehicle, making the initial determination based on whether one or more patterns of the lidar point cloud are consistent with and shared by one or more known lidar point cloud histories from the prior lidar point cloud information for a circumstance that includes an emergency scene with an emergency vehicle.

19. The system of claim 16, wherein the autonomous vehicle computer module is configured to at least facilitate, via the processor onboard the vehicle, making the initial determination based on whether one or more patterns of the lidar point cloud are consistent with and shared by one or more known lidar point cloud histories from the prior lidar point cloud information for a circumstance that includes a traffic impediment.

20. The system of claim 16, wherein the autonomous vehicle computer module is configured to at least facilitate, via the processor onboard the vehicle, making the initial determination based on whether one or more patterns of the lidar point cloud are consistent with and shared by one or more known lidar point cloud histories from the prior lidar point cloud information for a circumstance that includes a road blockage.

* * * * *